(12) United States Patent
Garamoun et al.

(10) Patent No.: US 11,221,258 B2
(45) Date of Patent: Jan. 11, 2022

(54) MEASURING DEVICE FOR ASCERTAINING THE TEMPERATURE OF A ROLLER SURFACE OF A ROLLER BODY

(71) Applicant: Robert Bosch GmbH, Stuttgart (DE)

(72) Inventors: Ahmed Garamoun, Stuttgart (DE); Hannes Rose, Shanghai (CN); Holger Frank, Pfullingen (DE); Peter Kunert, Lichtenstein (DE); Ronny Ludwig, Reutlingen (DE)

(73) Assignee: Robert Bosch GmbH, Stuttgart (DE)

( * ) Notice: Subject to any disclaimer, the term of this patent is extended or adjusted under 35 U.S.C. 154(b) by 472 days.

(21) Appl. No.: 16/326,435

(22) PCT Filed: Aug. 10, 2017

(86) PCT No.: PCT/EP2017/070322
§ 371 (c)(1),
(2) Date: Feb. 19, 2019

(87) PCT Pub. No.: WO2018/033471
PCT Pub. Date: Feb. 22, 2018

(65) Prior Publication Data
US 2021/0302241 A1   Sep. 30, 2021

(30) Foreign Application Priority Data
Aug. 19, 2016   (DE) .......................... 102016215602.0

(51) Int. Cl.
*G01K 1/00*   (2006.01)
*G01K 3/00*   (2006.01)
(Continued)

(52) U.S. Cl.
CPC ............. *G01K 13/08* (2013.01); *G01K 1/143* (2013.01); *G01K 1/146* (2013.01); *G01K 1/16* (2013.01)

(58) Field of Classification Search
USPC ................. 374/153, 208, 166, 137, 154, 110
See application file for complete search history.

(56) References Cited

U.S. PATENT DOCUMENTS

| 4,432,277 | A | * | 2/1984 | Hartmann | .............. D21G 1/002 100/162 B |
| 6,430,459 | B1 | * | 8/2002 | Moore | .................. G01L 5/0085 100/153 |

(Continued)

FOREIGN PATENT DOCUMENTS

| CN | 203702894 U | 7/2014 |
| CN | 104048762 A | 9/2014 |

(Continued)

OTHER PUBLICATIONS

International Search Report for PCT/EP2017/070322, dated Nov. 3, 2017.

*Primary Examiner* — Mirellys Jagan
(74) *Attorney, Agent, or Firm* — Norton Rose Fulbright US LLP; Gerard Messina

(57) ABSTRACT

A measuring device for ascertaining the temperature of a roller surface of a roller body is insertable into a recess of the roller body and includes at least first and second temperature sensors, a mounting rod on which the sensors are situated in the axial direction of the mounting rod spaced apart from each another, and, on each side of each respective one of the temperature sensor in the axial direction a respective supporting element arranged on the mounting rod. Between the supporting elements, the mounting rod is flexible such that each of the temperature sensors is able to be pressed onto an inner wall of the recess with a defined contact force.

12 Claims, 3 Drawing Sheets

(51) Int. Cl.
*G01K 7/00* (2006.01)
*G01K 13/08* (2006.01)
*G01K 1/16* (2006.01)
*G01K 1/14* (2021.01)
*G01K 1/143* (2021.01)

(56) References Cited

U.S. PATENT DOCUMENTS

| | | | | |
|---|---|---|---|---|
| 8,087,824 B2 * | 1/2012 | Bingham | ................ | G01K 1/14 374/141 |
| 2004/0184852 A1 * | 9/2004 | Takagi | ............... | G03G 15/2017 399/330 |

FOREIGN PATENT DOCUMENTS

| | | |
|---|---|---|
| DE | 10226411 A1 | 12/2003 |
| GB | 1113312 A | 5/1968 |
| JP | H04115131 A | 4/1992 |
| WO | 2014/195309 A1 | 12/2014 |
| WO | 2016/017284 A1 | 2/2016 |

\* cited by examiner

MEASURING DEVICE FOR ASCERTAINING THE TEMPERATURE OF A ROLLER SURFACE OF A ROLLER BODY

CROSS-REFERENCE TO RELATED APPLICATIONS

The present application is the national stage of International Pat. App. No. PCT/EP2017/070322 filed Aug. 10, 2017, and claims priority under 35 U.S.C. § 119 to DE 10 2016 215 602.0, filed in the Federal Republic of Germany on Aug. 19, 2016, the content of each of which are incorporated herein by reference in their entireties.

FIELD OF THE INVENTION

The present invention relates to a measuring device for ascertaining the temperature of a roller surface of a roller body. The measuring device is insertable into a recess of the roller body. The measuring device includes first and second temperature sensors.

BACKGROUND

A temperature measuring device is disclosed for example in published document WO 2014/195309 A1, which discloses a circuit board on which a plurality of sensors are situated at a distance from one another so as to be able to ascertain measured values across the entire length of the roller. For this purpose, the measuring device is inserted into a recess of the roller body and is injection molded in place. Temperature sensors can be used as sensors, which make it possible to record temperature values of the roller surface. The recorded temperature values can be used for example to monitor the roller bearing or also to infer process parameters in the rolling process.

SUMMARY

The present invention relates to a measuring device for ascertaining the temperature of a roller surface of a roller body. The measuring device is insertable into a recess of the roller body. The measuring device has at least a first temperature sensor and a second temperature sensor.

The measuring device has a mounting rod, on which the at least first and second temperature sensors are situated in the axial direction of the mounting rod spaced apart from one another and which has on each side of a temperature sensor in the axial direction respectively one supporting element. Between the supporting elements, the mounting rod is designed to be springy in such a way that each of the temperature sensors can be pressed onto an inner wall of the recess with a defined contact force.

An advantage in this respect is that the measuring device is able to ascertain the temperature across the entire length of the roller surface. The resolution of the measuring accuracy is a function of the number of sensors and their distance from one another. The contact force produced in the process ensures a reliable mechanical contact between the temperature sensor units and the inner wall of the recess. This makes it possible on the one hand to compensate for unevenness in the recess, which can be produced when the recess is bored, while on the other hand ensuring a reliable temperature measurement in spite of vibrations, for example, in the operation of the roller. The reason for this is that a reliable mechanical contact is equivalent to a reliable thermal coupling between the inner wall of the recess, which has approximately the temperature of the roller surface, and the respective temperature sensor. In addition, because of the contact force produced in the process and the corresponding supporting elements as counter-bearing, it is possible to fix the measuring device in place in the recess in such a way that the measuring device maintains its position also when the roller is in operation.

An advantageous development of the present invention provides for the mounting rod to be made of steel, in particular spring steel, at least between the supporting elements.

It is advantageous in this regard that steel has a suitable stiffness to allow for a simple insertion of the measuring device into the recess, but is nevertheless suitably flexible in order to produce together with the supporting elements a sufficient contact force on the temperature sensor unit in the installed state.

An advantageous development of the present invention provides for the supporting elements to be formed from steel and/or plastic.

It is advantageous in this regard that such supporting elements can be produced in a cost-effective and simple manner, for example by die casting.

An advantageous development of the present invention provides for the measuring device to have a wireless communication unit, an energy supply unit, and a processing unit, which are situated in a sleeve mounted on a front side of one end of the mounting rod. It is advantageous in this respect that the sleeve protects the electronic components against environmental impacts from outside. This extends the service life of the measuring device.

An advantageous development of the present invention provides for the sleeve to be developed as a supporting element. It is advantageous in this regard that one of the supporting elements at the end of the mounting rod can be eliminated if the sleeve already exists and is designed accordingly.

An advantageous example embodiment provides for the sleeve to have a first cross section and to be designed in such a way that the first cross section corresponds to a second cross section of the recess. It is advantageous in this regard that the sleeve closes the recess tightly. This makes it possible to protect the temperature sensor units for example against dirt and moisture from outside.

An advantageous example embodiment provides for at least the first temperature sensor or also the second temperature sensor to comprise a spring contact and a temperature sensor element, the temperature sensor being designed respectively in such a way that the temperature is transmittable from the inner wall of the recess via the spring contact to the temperature sensor element.

It is advantageous in this respect that a double spring action is achieved on the one hand by the mounting rod and on the other hand by the spring contact.

This makes it possible to improve the mechanical contact between the temperature sensor and the inner wall of the recess further. This furthermore makes it possible to extend the service life of the temperature sensors since the spring contact is able to reduce mechanical loads emanating from the contact between the inner wall of the recess and the temperature sensor. Such mechanical stresses could otherwise result for example in fissures in the circuit board of the temperature sensor and thus in its failure.

An advantageous example embodiment provides for the spring contact unit to have a spring element that is designed to be spiral-shaped or s-shaped. It is advantageous in this regard that such a spring element can be produced in a cost-effective and uncomplicated manner.

An advantageous example embodiment provides for the spring contact to have additionally a contact element and a guide element, the spring element being situated between the contact element and the temperature sensor element, and the guide element being designed in such a way that the guide element forms a guide for the contact element. It is advantageous in this regard that the direction of the spring action can be appropriately adapted by the guide element so as to achieve a reliable mechanical coupling between the contact element and the inner wall of the recess. Additionally, the contact elements is able to improve the thermal connection from the inner wall of the recess to the spring element and thus also to the temperature sensor.

DETAILED DESCRIPTION

Figure 1:
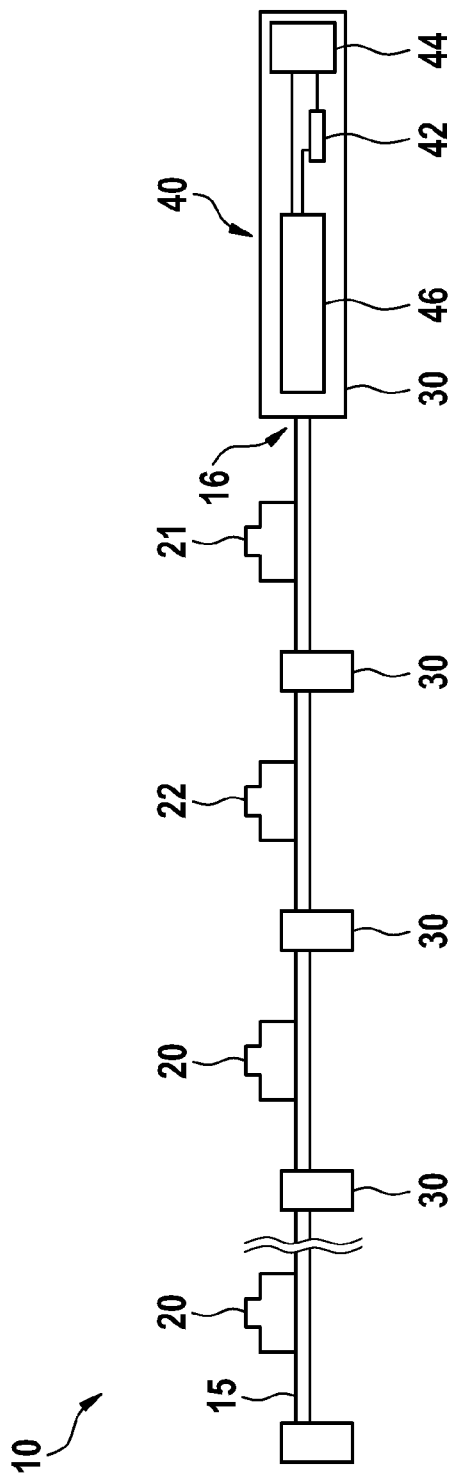
FIG. 1 shows a measuring device for ascertaining the temperature of a roller surface, according to an example embodiment of the present invention.

FIG. 1 shows an example embodiment of a measuring device 10 of the present invention for ascertaining the temperature of a roller surface. The measuring device 10 has a first temperature sensor 21, a second temperature sensor 22, and additional temperature sensors 20. Additionally, measuring device 10 has a mounting rod 15. Temperature sensors 20-22 are situated on mounting rod 15 spaced apart from one another in the axial direction of mounting rod 15. Mounting rod 15 furthermore has supporting elements 30, which are likewise situated in the axial direction on both sides of each temperature sensor 20-22. Measuring device 10 furthermore has a sleeve 40, which is attached on one end 16 of mounting rod 15, on the front side of mounting rod 15. A processing unit 46, a wireless communication unit 42, and an energy supply unit 44 are situated in sleeve 40. Processing unit 46 can be a microcontroller for example. Processing unit 46 is connected to temperature sensors 20-22 via a cable that is not shown, for example a BUS cable, in order to be able to record temperature values from each one of temperature sensors 20-22. Processing unit 46 is furthermore connected to communication unit 42 and is designed to transmit the recorded temperature values via the communication unit 42. The communication unit 42 can be a Bluetooth or WLAN unit, for example. Both processing unit 46 as well as communication unit 42 are additionally connected to energy supply unit 44. Energy supply unit 44 can be an energy store such as a battery or an accumulator, for example. Alternatively or also as a combination, energy supply unit 44 can also be designed as an energy harvesting unit or can have energy supplied to it from outside, for example inductively.

In an example embodiment that is not shown, the measuring device can additionally have at least one acceleration sensor. On the basis of acceleration values recorded by the acceleration sensor it is possible to infer for example an operating state or a running time of the roller or also a bearing state of the roller such as an imbalance for example.

Figure 2:
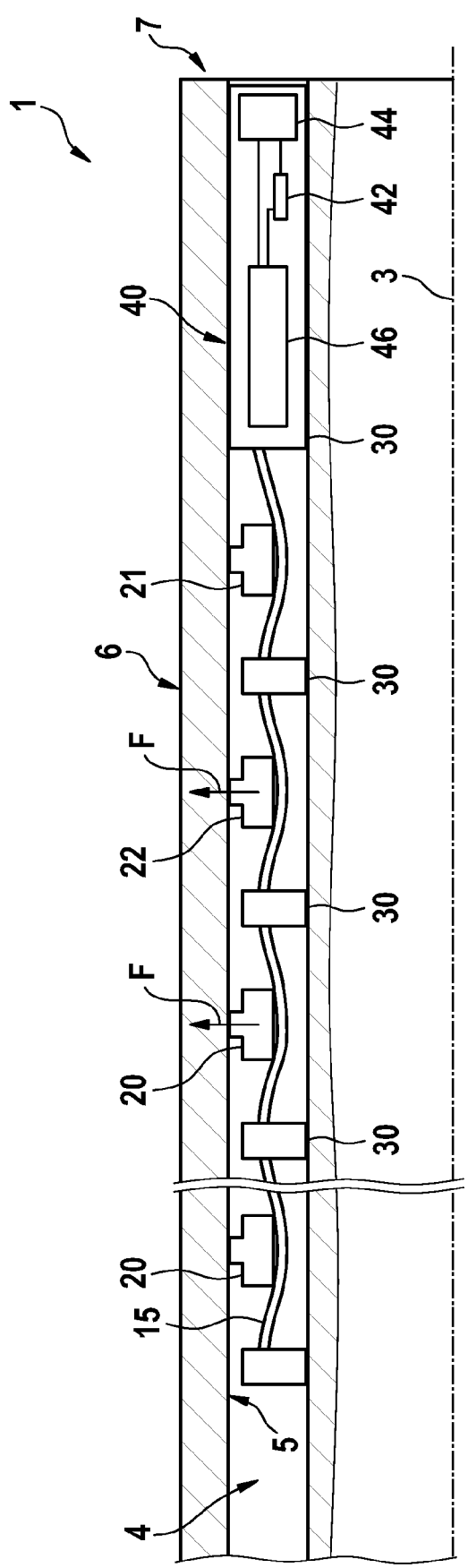
FIG. 2 shows a measuring device for ascertaining the temperature of a roller surface, as shown in FIG. 1, inserted in a recess of a roller body, according to an example embodiment of the present invention.

FIG. 2 shows the example embodiment of the measuring device of the present invention for ascertaining the temperature of a roller surface as shown in FIG. 1, which is inserted in a recess of a roller body 1 that has an axis of rotation 3, a roller surface 6, a front side 7, and a recess 4 on front side 7. Such a recess 4 can be a bore hole, for example. Recess 4 runs in particular parallel to axis of rotation 3 of roller body 1. In order to ascertain the temperature of roller surface 6 as precisely as possible, recess 4 is also situated as close as possible to roller surface 6 since thus the temperature of roller surface 6 approximately agrees with the temperature of an inner wall of recess 4. Measuring device 10, developed for example as shown in FIG. 1, is inserted into recess 4. Between the supporting elements 30, the mounting rod 15 is designed to be springy in such a way that each one of temperature sensors 20-22 is pressed onto inner wall 5 of recess 4 with a defined contact force F. Supporting elements 30 act as counter-bearings in the opposite direction of contact force F. The inserted measuring device thus stabilizes itself due to the design and mounting rod 15 is deformed in a wavelike shape. Contact force F can be adjusted on the one hand by the stiffness of mounting rod 15 and on the other hand by the spacing between supporting elements 30. Measuring device 10 is inserted in recess 4 in particular in such a way that temperature sensors 20-22 are pressed in the direction of roller surface 6, and supporting elements 30 are accordingly pressed in the direction of axis of rotation 3 of roller body 1. Sleeve 40 of measuring device 10 is additionally designed in such a way that it acts as a supporting element 30 for first temperature sensor unit 21. Sleeve 40 is furthermore designed in such a way that it fills recess 4 entirely, that is, in particular that a first cross section of sleeve 40 matches a second cross section of recess 4. Sleeve 40 in particular ends flush with front side 7 of roller body 1 and thus seals recess 4 vis-a-vis the outside.

In an example embodiment that is not shown, a cover element can also be provided that closes recess 4.

Figure 3:
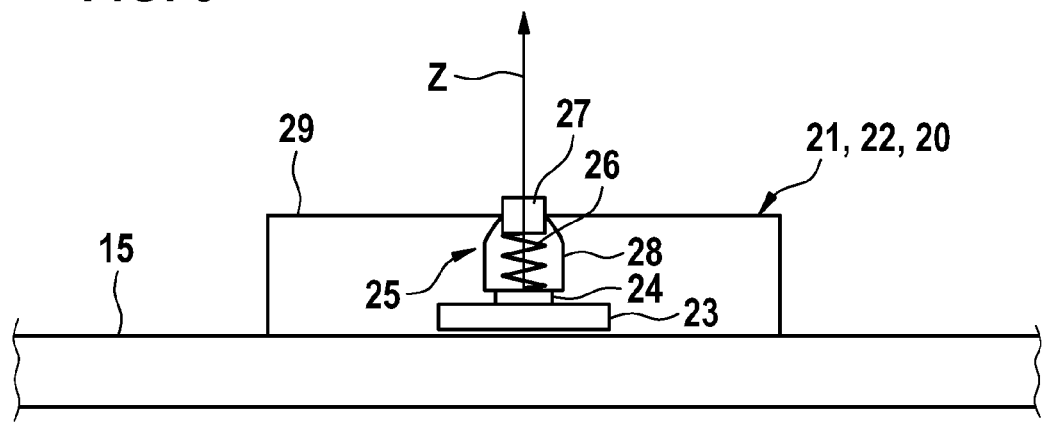
FIG. 3 shows a temperature sensor of a measuring device, according to an example embodiment of the present invention.

FIG. 3 shows an example embodiment of a temperature sensor of a measuring device according to an example embodiment of the present invention. Temperature sensors 20, 21, or also 22 are situated on mounting rod 15 as shown in FIG. 1. Temperature sensor 20, 21, or also 22 has an optional housing 29. Arranged inside housing 29 is a circuit board 23, on which in turn a temperature sensor element 24 is situated. Additionally, an evaluation circuit for example (not shown) can be situated on circuit board 23, which is designed for example as a bus-capable microcontroller having an individual identifier. Temperature sensor element 24, for example a Platinum measuring resistor, is connected to a contact element 27 via a spiral-shaped or s-shaped spring element 26. Contact element 27, spring element 26, and a guide element 28 form a spring contact 25. Guide element 28 is designed in such a way that it forms a guide for contact element 27, which is as a result movable only along an axis z perpendicular to a plane of circuit board 23. The contact force F shown in FIG. 2 also runs along axis z.

Figure 4:
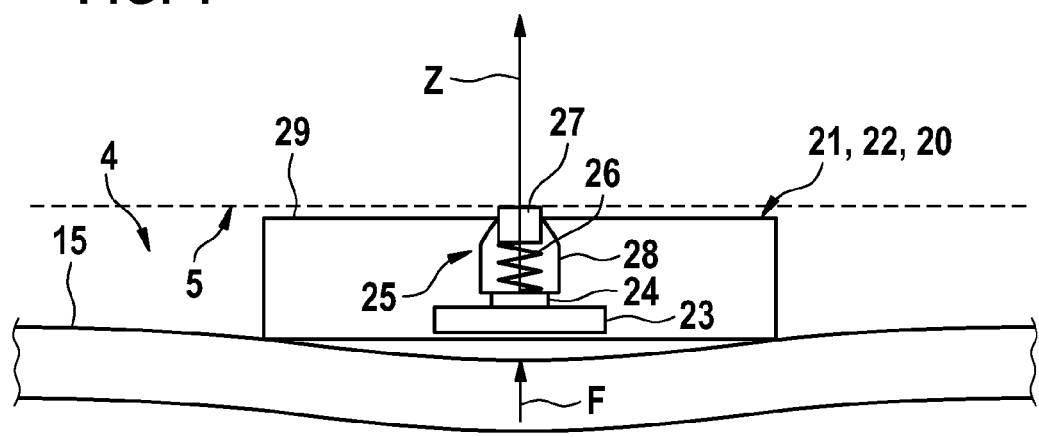
FIG. 4 shows the temperature sensor of FIG. 3 when the measuring device is inserted into a recess of a roller body, according to an example embodiment of the present invention.

FIG. 4 shows the example embodiment of the temperature sensor, as shown in FIG. 3, of a measuring device, when the measuring device is inserted into a recess of the roller body, according to an example embodiment of the present invention. A temperature sensor 20, 21, or also 22 are shown as in FIG. 3. Contact force F, which is produced by mounting rod 15 and supporting elements 30 (not shown), presses temperature sensor unit 20, 21, or also 22 onto inner wall 5 of recess 4. Contact element 27 of spring contact 25 is thereby connected to inner wall 5 and is able to transmit the temperature from the latter via spring element 26 to temperature sensor element 24. For this reason, in particular contact element 27 and spring element 26 should be made from a material having good thermal conductivity.

In an example embodiment that is not shown, spring contact 25 has only one spring element 26, which transmits the temperature from inner wall 5 of recess 4 directly to temperature sensor element 24.

What is claimed is:

1. A measuring device for ascertaining a temperature of a roller surface of a roller body, the measuring device being insertable into a recess of the roller body, the measuring device comprising:
   a first temperature sensor;
   a second temperature sensor; and
   a mounting rod on which the first and second temperature sensors are situated spaced apart from each other in an axial direction of the mounting rod,
   wherein for each of the first and second temperature sensor, on each side of the respective temperature sensor, in the axial direction, a respective supporting element arranged on the mounting rod, and
   wherein the mounting rod is flexible between the supporting elements such that each of the first and second temperature sensors is able to be pressed with a defined contact force against an inner wall of the recess.

2. The measuring device of claim 1, wherein the mounting rod is made of steel at least between the supporting elements.

3. The measuring device of claim 1, wherein the mounting rod is made of spring steel at least between the supporting elements.

4. The measuring device of claim 1, wherein the supporting elements are formed from at least one of steel and plastic.

5. The measuring device of claim 1, further comprising:
   a wireless communication unit, an energy supply, and a processing unit that are situated in a sleeve mounted on an end of the mounting rod.

6. The measuring device of claim 5, wherein the sleeve is one of the supporting elements.

7. The measuring device of claim 5, wherein the sleeve has a cross section that corresponds to a cross section of the recess.

8. The measuring device of claim 1, wherein each or both of the first and second temperature sensors includes (a) a temperature sensor element and (b) a spring contact via which the temperature is transmittable from the inner wall of the recess to the respective temperature sensor element.

9. The measuring device of claim 8, wherein the spring contact has a spiral-shaped or s-shaped spring element.

10. The measuring device of claim 9, wherein the spring contact includes only one spring element which is configured to transmit the temperature from the inner wall directly to the temperature sensor element.

11. The measuring device of claim 9, wherein the spring contact includes a contact element and a guide for the contact element, and the spring element is situated between the contact element and the temperature sensor element.

12. The measuring device of claim 11, wherein the contact element is connected to the inner wall.

* * * * *